Feb. 24, 1942.  A. S. BEHRMAN  2,274,231
BATTERY SEPARATOR
Filed April 12, 1937
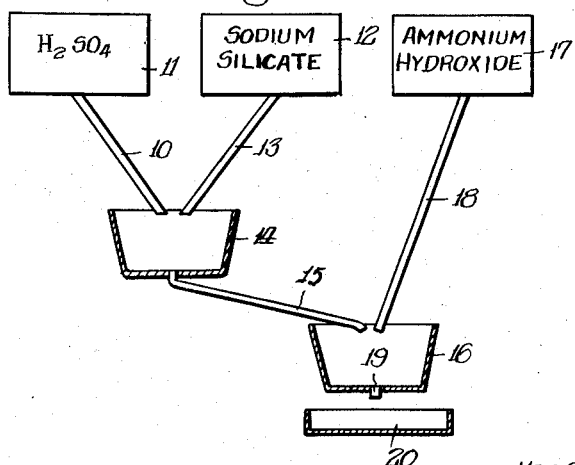
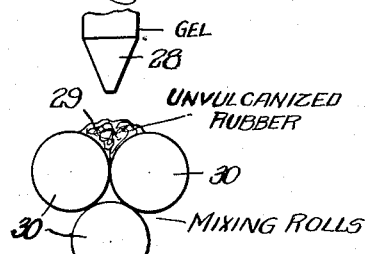
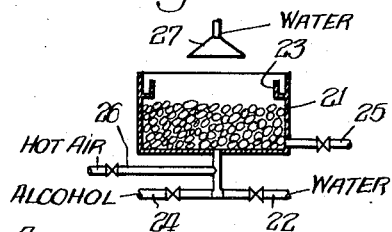
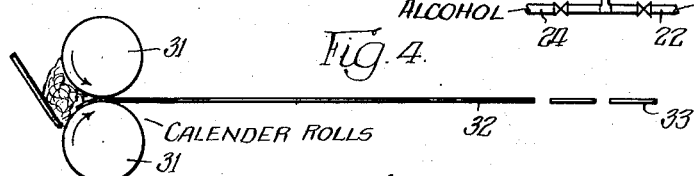
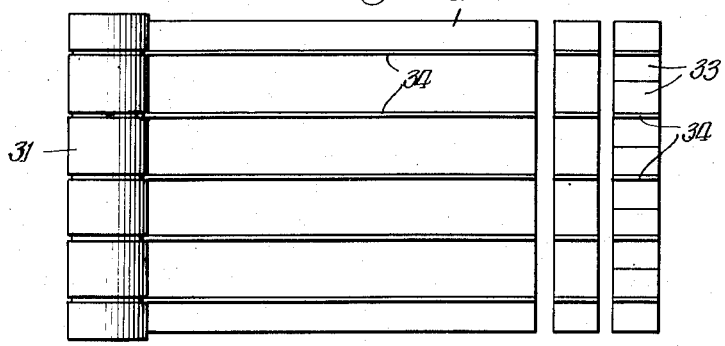
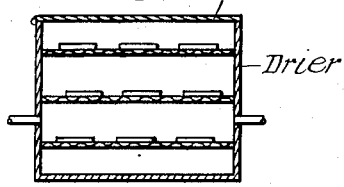
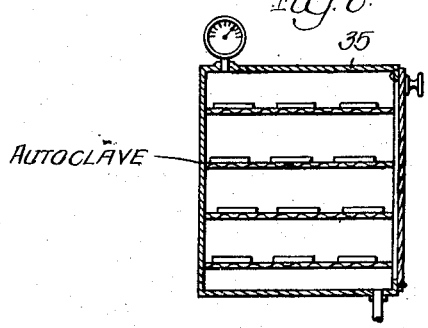
INVENTOR.
Abraham Sidney Behrman,
BY
Cromwell, Greist & Warden
ATTORNEYS Patented Feb. 24, 1942

2,274,231

UNITED STATES PATENT OFFICE 2,274,231

BATTERY SEPARATOR

Abraham Sidney Behrman, Chicago, Ill., assignor to A. S. Behrman, trustee of Porous Rubber Products Trust, Chicago, Ill.

Application April 12, 1937, Serial No. 136,352

6 Claims. (Cl. 18—53)

The present invention relates to the production of porous diaphragms of the type employed for storage battery separators.

A principal object of the invention is the provision of an improved porous diaphragm or separator of the type described in my Reissue Patent No. 18,214, issued September 29, 1931, in which a binder composed of a composition such as rubber has incorporated in it an ultra microporous substance such as silica gel.

An additional object is to produce a porous storage battery separator plate in which a binder has a continuous porosity provided in part by the presence of an ultra microporous material such as silica gel and in further part by spaces adjacent the gel particles.

Still another object of the invention is the production of a porous diaphragm in which a plastic body portion is combined with wetted particles of a pre-dried ultra microporous gel which when re-dried after being combined with the body portion will shrink to an extent sufficient to provide minute spaces or openings in the body portion adjacent the gel particles.

A further object includes the provision of an improved porous diaphragm and method of making the same for use as a separator in electric cells of the primary or secondary type, electrolytic cells, and filters where a chemically resistant diaphragm permeable to an electric current is desirable.

These and other objects will be observed from a consideration of the following description of the invention and by reference to the accompanying drawing, in which—

Fig. 1 is a somewhat diagrammatic view of apparatus for effecting the formation of a hydrogel;

Fig. 2 is a view of apparatus for drying the hydrogel, washing it with water, washing it with alcohol, and rewetting the gel;

Fig. 3 is a view illustrating apparatus for the mixture of hydrogel with rubber;

Fig. 4 is a view of apparatus for forming the mixture of hydrogel and rubber into separator blanks;

Fig. 5 is a top view of the apparatus shown in Fig. 4;

Fig. 6 is a view of an autoclave for vulcanizing the separators; and

Fig. 7 is a view of a drier for the finished separators.

In my Reissue Patent No. 18,214 there is described a porous diaphragm which has proven to be highly successful for uses in battery separators and the like. The product includes a rubber body portion in which is imbedded particles of ultra microporous silica gel, the particles being of sufficient proximity and continuous placement to provide microscopic passages extending through the separator. In accordance with the present invention the diaphragm is produced with a special type of gel material having the capacity of shrinking after being formed into the desired shape and in admixture with the bonding material forming the body portion of the separator.

Ordinarily, silica gel particles produced by the complete drying of a hydrogel as described in my Patent No. 1,755,496 have the capacity of retaining their shape and size even after repeated wettings and dryings. In forming separator plates from such particles the finely divided particles are masticated with rubber and formed into the desired shape. When the resulting diaphragm is dried the gel particles retain their original volume. However, I have found that there is a class of dried gel products which has been produced by replacing the water of a hydrogel with a non-peptizing liquid such as ethyl or methyl alcohol, acetone, ethyl ether or the like, prior to drying, which may be employed to provide small spaces or pores in the body portion of the separator adjacent the gel particles. These gels, which will be referred to herein and in the appended claims as "alcogels", when dried have the capacity of shrinking when wetted with water and re-dried, and by incorporating the shrinkable gel particles in the separator, wetting them with water and subsequently re-drying them, the body of the separator has imparted to it a porosity due in part to voids left therein by shrinkage of the gel particles.

In producing dried shrinkable gel particles of this type, a silica hydrogel is made as by the process of my Patent No. 1,755,496. The water of hydration of the hydrogel is replaced by alcohol as by an alcohol washing operation and then the gel is dried. The apparent density of gels formed in this manner may be of the order of 15 to 18 pounds per cubic foot. When produced into separators in the manner described herein, the density of these gels will rise to such an extent as materially to increase the porosity of the separator due to the voids left by the shrinkage occurring upon re-drying the gel after incorporation in the binder. The salts resulting from the formation of the hydrogel may be washed out with water before the water is replaced by alcohol.

Gels produced in this manner are formed into the desired shape in admixture with rubber. For example, the gel particles may be wetted and masticated with ordinary commercial grades of rubber such as pale crepe, smoked sheet, or reclaimed rubber on ordinary calender rolls or a mill in the usual manner, plasticizers being employed if so desired, to produce a smooth plastic consistency. A substantial quantity of the wet mass of shrinkable gel particles is worked into the rubber and the rubber is formed into the shape of battery separators. As will be understood, the amount of water present should be sufficient to permit the mass to be worked but is not so large as to cause inversion of the rubber phase. Various other materials may be added to the mass if desired.

The formation of the hydrogel is illustrated in the apparatus shown in Fig. 1, in which sulfuric acid is conveyed through pipe 10 from tank 11 and mixed in a stream with sodium silicate taken from the tank 12 through line 13. The mixture falls into a reaction chamber 14, from which it is transferred to line 15 to a second reaction chamber 16 in which it is subjected to stream mixing with ammonium hydroxide taken from tank 17 through line 18. The resulting mixture sets as a gel quite rapidly and before this occurs it is transferred through the outlet 19 to a form 20.

From the form 20 the hydrogel is transferred in broken-up condition to the treating tank 21. In the tank 21 the hydrogel may be washed with water to remove dissolved salts by passing water upwardly therethrough from the conduit 22, the overflowing water passing out of the tank through the launder 23. When the proper amount of washing has occurred the line 22 is cut off and the water in the gel may be displaced by alcohol by passing alcohol upwardly through the hydrogel from line 24. It will be understood that after the washing with water and alcohol are complete the excess of these liquids may be drained from the tank through the conduit 25. After washing with alcohol and draining the excess alcohol from the hydrogel hot air may be blown through the resulting alcogel by closing line 24 and opening line 26 through which hot air is blown.

The dried alcogel resulting from the process described may again be wetted with water through the spray 27 to provide a shrinkable material.

The wetted shrinkable alcogel may be transferred to a hopper 28 and passed therefrom in admixture with unvulcanized rubber indicated by the mass 29 shown in Fig. 3. The mixing rolls 30 produce a homogenous mixture of the wetted shrinkable alcogel and the unvulcanized rubber. This mixture is transferred to the calender rolls 31 which press it into a ribbed sheet shown at 32 in Figs. 4 and 5. In the production of separators from this sheet blanks 33 are cut from the sheet.

After the production of the separator blanks, which may be provided with a suitable ribbed structure indicated at 34, the separator blanks are transferred to an autoclave indicated at 35 and therein are subjected to a vulcanization process. After the separators are vulcanized they are transferred to a drier indicated at 36. Hot air is passed through the drier to dehydrate the wetted alcogel. This dehydration effects a shrinkage of the gel and there results a finished separator plate which is porous, due to the shrinkage of the gel, as well as to the porosity of the silica particles imbedded therein.

After the rubber compound is cured the resulting article is dried and in drying the wetted alcogel the gel assumes a density in excess of the original density in the dry state, thereby producing small spaces interiorly of the body portion of the separator and adjacent the particles. Thus, the diaphragm will have a porosity due in part to the ultra microporosity of the gel which is incorporated in the separator and in further part to the small openings in the rubber caused by shrinkage of the gel particles.

As an example of the use of the shrinkable gels, a satisfactory separator was made by employing 100 parts by weight of a 200-mesh alcogel of 15 to 16 pounds per cubic foot density with about 130 parts by weight of concentrated latex compound containing about 60 per cent rubber and the usual amounts of sulfur and accelerator. About 2.3 parts by weight of ammoniated water were used with the mixture. After thorough commingling the mixture was shaped, dried and vulcanized. The drying operation resulted in the shrinkage of the gel to an apparent density of between 25 and 30 pounds per cubic foot, thereby creating many small voids in the body of the separator.

Alcogels which are shrinkable upon being wetted and re-dried may have apparent densities of approximately 25 pounds per cubic foot or less, and the extent to which the shrinkage occurs after the gel is compounded with the rubber will depend upon the method of manufacture and the apparent density.

A shrinkable gel of even lower apparent density than that described hereinbefore may be produced by replacing the water of a hydrogel produced in accordance with my Patent No. 1,755,496 with alcohol and then heating the gel in an autoclave to a temperature above the critical temperature of alcohol and driving off the alcohol at that temperature. The apparent density of gels produced in this manner may be of the order of 5 to 6 pounds per cubic foot. Upon being compounded in a separator and dried a light gel of this character has a marked shrinkage which depends in extent upon the original density.

This pre-dried shrinkable alcogel also may be worked into the form of battery separators with rubber latex or other uncured rubber compositions such as smoked sheet or the like. For example, successful separators have been made by employing a mixture of 170 parts by weight of latex compound, 50 parts by weight of shrinkable silica alcogel having an apparent density of 5.7 pounds per cubic foot, and 230 parts by weight of ammoniacal water. The latex composition used in the mix was prepared by adding to concentrated latex of about 60 per cent rubber concentration the usual amounts of sulfur and accelerator. The ammoniated water was prepared by diluting 100 parts of 1:1 ammonium hydroxide with 1000 parts of water. The water imparted a desirable fluidity to the mix and prevented coagulation of the latex. The water was added to the latex and the gel then was added to the mixture in small portions with stirring or kneading of the mix. The resulting thick paste was formed into sheets in suitable molds and subjected to a vulcanization operation with steam before or after drying. Upon drying, the silica gel shrank to a smaller volume than when added to the rubber compound so that the resulting separator plates had an increased porosity due to the shrinking.

The amount of the shrinking which the gel undergoes will depend upon such factors as the method by which the gel has been produced. Ordinarily, dried silica hydrogels have an apparent density of about 30 to 40 pounds per cubic foot and the alcohol gels of the type employed herein will return on wetting with water and re-drying to a density approximately of this order.

It is difficult to determine definitely the explanation for the shrinkage upon wetting and re-drying of silica gel particles produced from a hydrogel in which the water of hydration is replaced by a non-peptizing liquid such as alcohol. However, I have found that these gel particles, which may be referred to as "alcogel," are particularly suited for the formation of battery separators. The provision of a microporosity which is dependent in part on voids in the separator and pores in the dried particles of silica gel results in a battery separator of great utility. The combination of the two types of pores facilitates penetration of the separator by an electric charge. In general, it is preferred to employ as starting material gel particles having an apparent density of approximately 18 pounds per cubic foot or less, which particles will shrink to a density of 25 pounds or more upon being wetted and re-dried.

The rubber technique required for compounding the pre-dried shrinkable gel into the proper form, shaping the compounded rubber and wet gel, drying the shaped mixture, and curing or vulcanizing the rubber to form a finished separator may vary to a substantial extent, as will be understood. As shown by the specific examples given herein the amount of the silica gel which is compounded with the rubber binder can vary widely. The hydrogel from which the alcogel is produced is made in any suitable manner as by reacting alkaline silica compounds with an acid and ammonium hydroxide.

Due to their low density and other physical characteristics, the alcogels also constitute desirable materials for incorporation in a suitable binder without wetting with water and re-drying, and in some cases the alcogel may contain a non-peptizing liquid in its pores.

The invention has been described with reference to the use of rubber as a binder but it is to be understood that other inert materials such as asphaltum and synthetic condensation products may be utilized. Other shrinkable dried gel particles similar to silica alcogel may be used for imparting the desired porosity to the binder.

An important advantage of the use of low density gels of this type resides in the fact that separators can be produced by employing substantially the same quantity of low density gels as in the case of the use of high density gels. As the density of the gels used in accordance with the present invention are less than the density of gels used heretofore, a greater number of separators can be produced with the same weight o material.

All such changes and modifications are intended to be included in the appended claims.

I claim:

1. An article of the type described, comprising a continuous rubber phase having substantially continuous communicating pockets containing particles of silica gel of the type having an apparent density of less than substantially 25 pounds per cubic foot when admixed with said rubber, said particles being smaller in size than said pockets to provide a continuous porosity due in part to voids in said rubber and in part to the porosity of said particles.

2. The process which comprises forming a mixture between rubber, water and shrinkable silica gel of the type having an initial apparent density of less than substantially 25 pounds per cubic foot in dried form, and subjecting the resulting composite article to a drying process.

3. An article of the type described, comprising an inert binder having a continuous porosity provided by communicating voids partially filled with silica gel particles.

4. The process which comprises incorporating dried particles of a shrinkable gel having an apparent density of less than substantially 25 pounds per cubic foot with an inert binder in the presence of water, and drying the resulting composite article.

5. The process which comprises producing a wet mixture of alcogel with an inert binder, and subjecting said mixture to a drying step.

6. The process which comprises forming a mixture of unvulcanized rubber, water and a pre-dried silica alcogel, shaping the mixture into battery separator blanks, vulcanizing the mixture, and drying the vulcanized mixture to produce a battery separator of a continuous porosity due in part to voids and in part to the porosity of the gel particles.

ABRAHAM SIDNEY BEHRMAN.